US007293742B2

(12) United States Patent
Sadeck

(10) Patent No.: US 7,293,742 B2
(45) Date of Patent: Nov. 13, 2007

(54) REEFING ASSEMBLY FOR A CIRCULAR PARACHUTE

(75) Inventor: James Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 301 days.

(21) Appl. No.: 11/104,745

(22) Filed: Apr. 13, 2005

(65) Prior Publication Data

US 2006/0231684 A1 Oct. 19, 2006

(51) Int. Cl.
*B64D 17/00* (2006.01)
*B64D 17/34* (2006.01)

(52) U.S. Cl. .................. 244/149; 244/138 R; 244/142; 244/147

(58) Field of Classification Search ............ 244/138 R, 244/142, 145, 147, 149, 152, 31
See application file for complete search history.

(56) References Cited

U.S. PATENT DOCUMENTS

| | | | |
|---|---|---|---|
| 1,857,014 A * | 5/1932 | Ducoty | 244/142 |
| 2,525,798 A * | 10/1950 | Hattan | 244/142 |
| 2,566,585 A * | 9/1951 | Smith | 244/152 |
| 3,278,143 A * | 10/1966 | Engel, Jr. | 244/150 |
| 4,065,079 A | 12/1977 | Winchurch | |
| 4,524,930 A | 6/1985 | Lindgren et al. | |
| 4,678,145 A * | 7/1987 | Buehrer et al. | 244/152 |
| 4,863,119 A | 9/1989 | Case et al. | |
| 5,209,436 A * | 5/1993 | Lee | 244/152 |
| 5,890,678 A | 4/1999 | Butler, Jr. | |
| 5,899,415 A * | 5/1999 | Conway et al. | 244/152 |
| 6,843,451 B1 * | 1/2005 | Fox, Jr. | 244/152 |
| 7,028,951 B1 * | 4/2006 | Sadeck | 244/152 |
| 7,059,570 B2 * | 6/2006 | Strong | 244/147 |
| 2003/0038215 A1 * | 2/2003 | Benney et al. | 244/145 |

* cited by examiner

*Primary Examiner*—Victor Batson
*Assistant Examiner*—Kristen C Hayes
(74) *Attorney, Agent, or Firm*—Vincent J. Ranucci

(57) ABSTRACT

A reefing assembly for a circular parachute having a canopy including a skirt portion, and suspension lines attached to the skirt portion. The assembly includes a tension structure bounding a central opening and having a plurality of straight segments. A plurality of cords, each cord having two ends, are each fixed to one end of one of the tension structure straight segments to define a loop, and a plurality of rings slidably disposed on each of the loops. Each of the rings is slidably connected to at least one of the suspension lines. The rings are clustered together at a central portion of their respective loops, and upon deployment of the canopy, slide along their respective loops to become substantially equidistantly disposed on their respective loops. The assembly facilitates a restrained opening of the canopy and thereby reduces opening shock load.

11 Claims, 11 Drawing Sheets

REEFING ASSEMBLY FOR A CIRCULAR PARACHUTE

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

The invention relates to parachutes and is directed more particularly to a reefing assembly for use in conjunction with a circular parachute to reduce parachute opening shock load.

2. Description of the Prior Art

Parachutes are often used to deliver cargo to remote and inaccessible rough terrain areas. They are also used to resupply military units on land and at sea. Deployment of parachutes usually occurs after a cargo aircraft reduces its speed from its cruise velocity to some lower velocity at low altitude to allow deployed cargo parachutes to survive shock loads generated during the parachute opening phase of the airdrop. High altitude deployment of cargo parachute systems is especially difficult because of the low density/high altitude effect on airspeed of the aircraft. For example, an aircraft at an altitude of 25,000 ft., under standard atmospheric conditions, having an indicated airspeed of 130 knots is actually at a true airspeed of about 240 knots. Parachute opening forces increase with increased dynamic pressure, and dynamic pressure increases directly with the square of the aircraft true airspeed.

High dynamic pressures force a parachute to open very quickly, reducing opening time to fractions of a second. This situation can cause explosive, damaging and catastrophic openings. To prevent such events from happening during the deployment and opening phase of a parachute, methods to slow the opening have been devised. The methods are typically referred to as "reefing". Reefing techniques usually involve restricting the initial diameter of the parachute canopy at it's skirt, where the suspension lines attach to the canopy. This is accomplished by skirt reefing or line reefing.

Skirt reefing employs a cord which is passed through rings attached to the parachute skirt at each suspension line towards the inside of the canopy. The cord length is predetermined, depending on the degree of reefing required. A pyrotechnic device, with a time delay, is activated upon deployment from the aircraft. The device is used to provide a length of time in which the canopy is reefed, and then activate a blade to cut the reefing line at the skirt, allowing the parachute to fully open, or open to a second stage of reefing.

Line reefing forces the suspension lines to remain together in a bundle at a predetermined distance from the parachute skirt, thereby controlling the initial diameter of the parachute. Again, a time delayed pyrotechnic device is used to determine reefing time and to effect cutting of a retaining line to allow release of the suspension lines. A second method of line reefing makes use of the dynamic pressure exerted on a sail positioned at the middle of all the suspension line groups and attached to each suspension line group by a ring through which each line group passes. During the opening of the parachute, the pressure on the sail forces the suspension line groups closer together while the canopy begins to open and the entire canopy/payload system slows down. As the canopy inflates and spreads, the sail is forced to slide down the suspension line groups, allowing the canopy to continue to fully open.

With both types of reefing methods, when disreefing begins, inflation accelerates and high forces are exhibited upon the full open canopy with over inflation often occurring. Further, both types rely upon the proper functioning of a time-delayed pyrotechnic activated cutter device to cut reefing lines at pre-set times. Such devices add expense and weight to a parachute pack and necessarily include an explosive, a timer, and a sharp instrument.

There is a need for a reefing assembly for parachutes which reduces the shock load produced by rapid opening of the parachutes, and which does not require the use of a timed pyrotechnic device, nor a cutter device activated thereby for physically severing one or more reef lines.

SUMMARY OF THE INVENTION

An object of the invention is, therefore, to provide a reefing system which does not rely upon a pyrotechnic device operated at a pre-set time to cause cutter blades to sever reef lines.

With the above and other objects in view, a feature of the invention is the provision of a reefing assembly for a circular parachute having a canopy, a skirt portion thereof, and suspension lines attached at first ends thereof to the skirt portion. The reefing assembly includes a central tension structure defined by a plurality of substantially straight webbing or tape segments viewed in plan with the canopy open. A plurality of cords are provided, each cord defining a loop having two ends, each end of a loop being fixed to one end of one of the tension structure straight segments. A plurality of rings are slidably disposed on each of the loops, each of the rings being slidably connected to at least one of the suspension lines with equal numbers of the rings being disposed on each of the loops. The rings are adapted for disposition clustered together at a central portion of their respective loops, and adapted, upon deployment of the canopy, to slide along their respective loops to become substantially equidistantly disposed on their respective loops. The reefing assembly facilitates a restrained opening of the canopy, thereby to reduce opening shock load.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
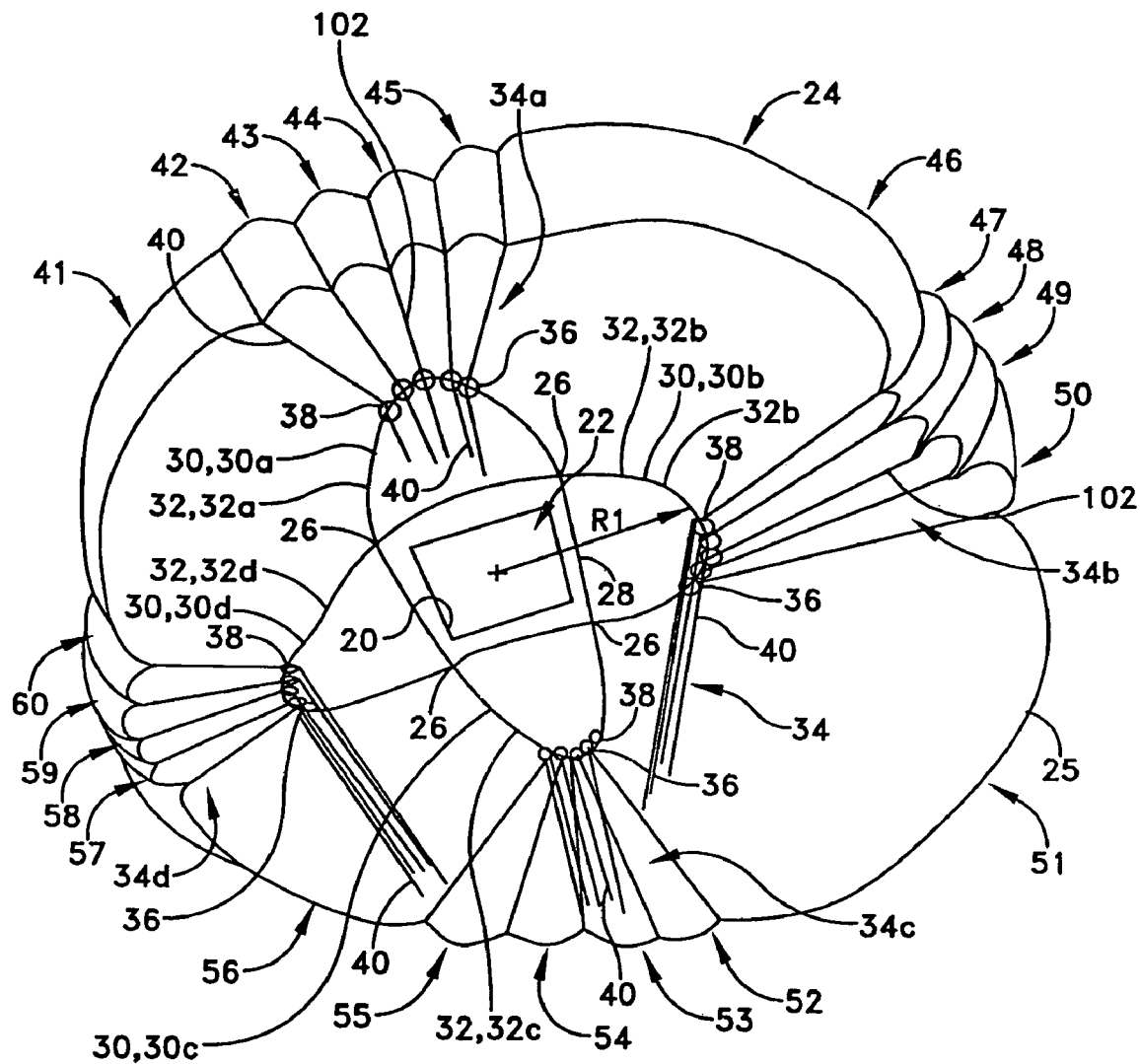
FIG. 1 is an underneath diagrammatic perspective view of one form of parachute having a reefing assembly illustrative of an embodiment of the invention.
Figure 1A:
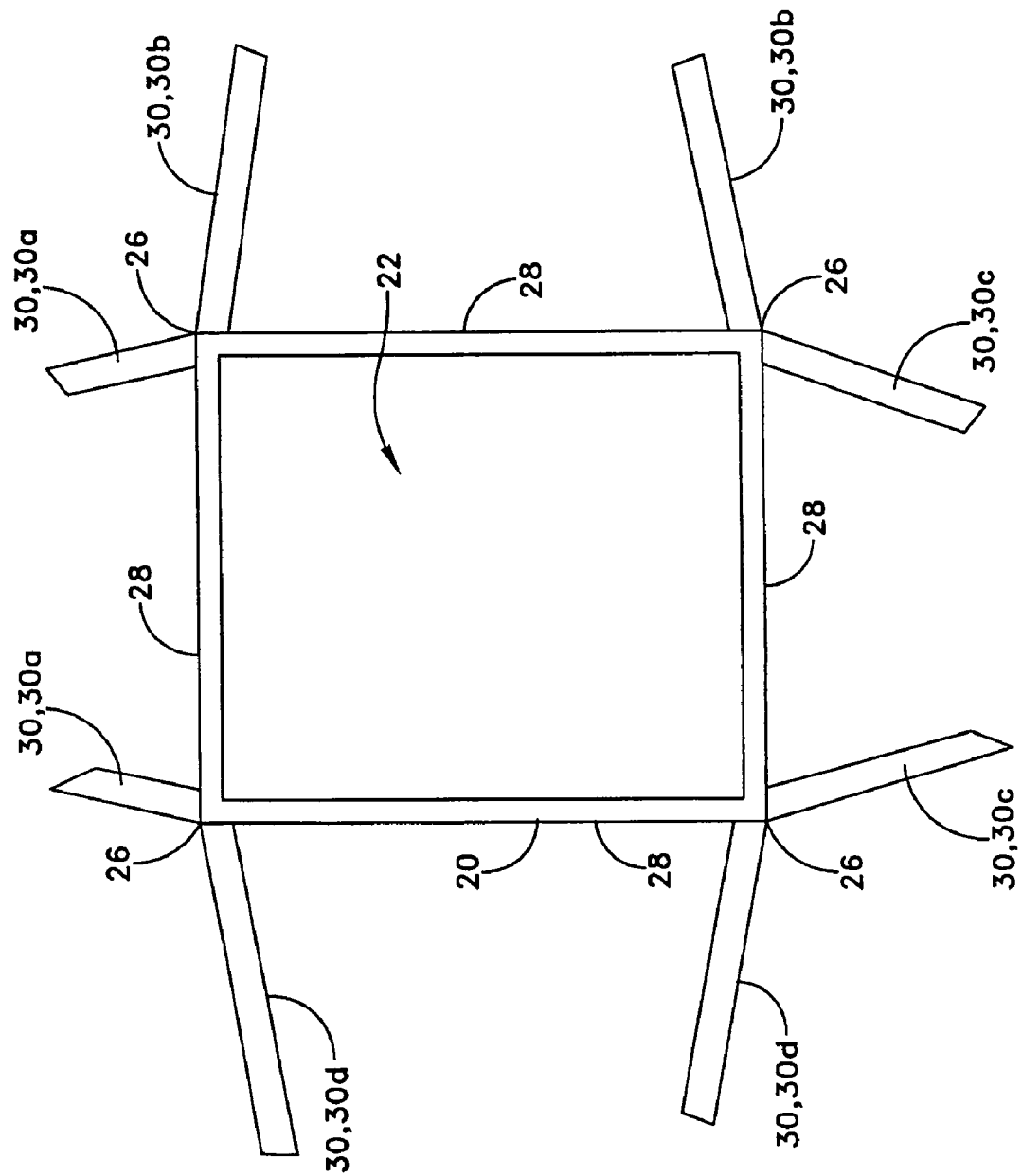
FIG. 1A is a plan view of a central portion of the tension structure of FIG. 1.

Referring to FIGS. 1 and 1A, it will be seen that an illustrative reefing assembly includes a high strength narrow webbing or tape forming a central tension structure 20 bounding a central opening 22. Attached at corners 26 of the structure 20 are high strength cords 30a, 30b, 30c and 30d forming continuous loops 32a, 32b, 32c and 32d with each segment 28 of the tension structure 20. The number of segments 28 of the tension structure 20 usually is equal to the number of suspension line groups 34, or risers, in the parachute system.

In FIG. 1, the parachute is provided with four line groups 34a, 34b, 34c and 34d. Therefore, there are four cord loops 32a, 32b, 32c, and 32d formed with the tension structure 20. FIG. 1 is a view looking into the mouth of the parachute canopy 24 as it is opening in a first phase of reefing with the reefing assembly.

High strength cord loops 32 have ring sets 38 mounted on them. All of the ring sets 38 are allowed to slide along cord loops 32 and there is a ring set 38 for each suspension line 40. Each suspension line 40 passes through its corresponding ring 36 on the ring set 38.

Figure 2:
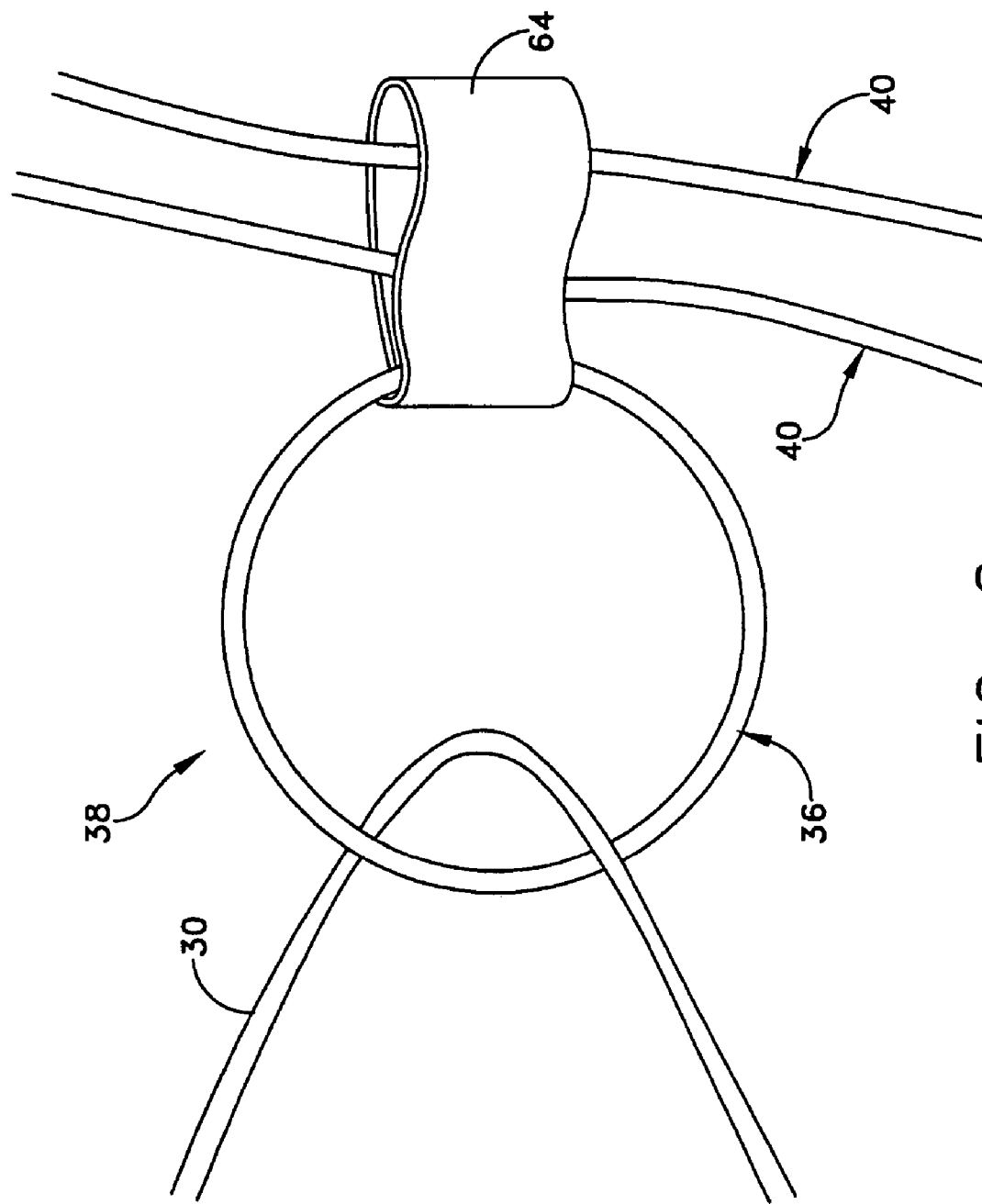
FIG. 2 is a detailed perspective view of a portion of the assembly of FIG. 1.
Figure 2A:
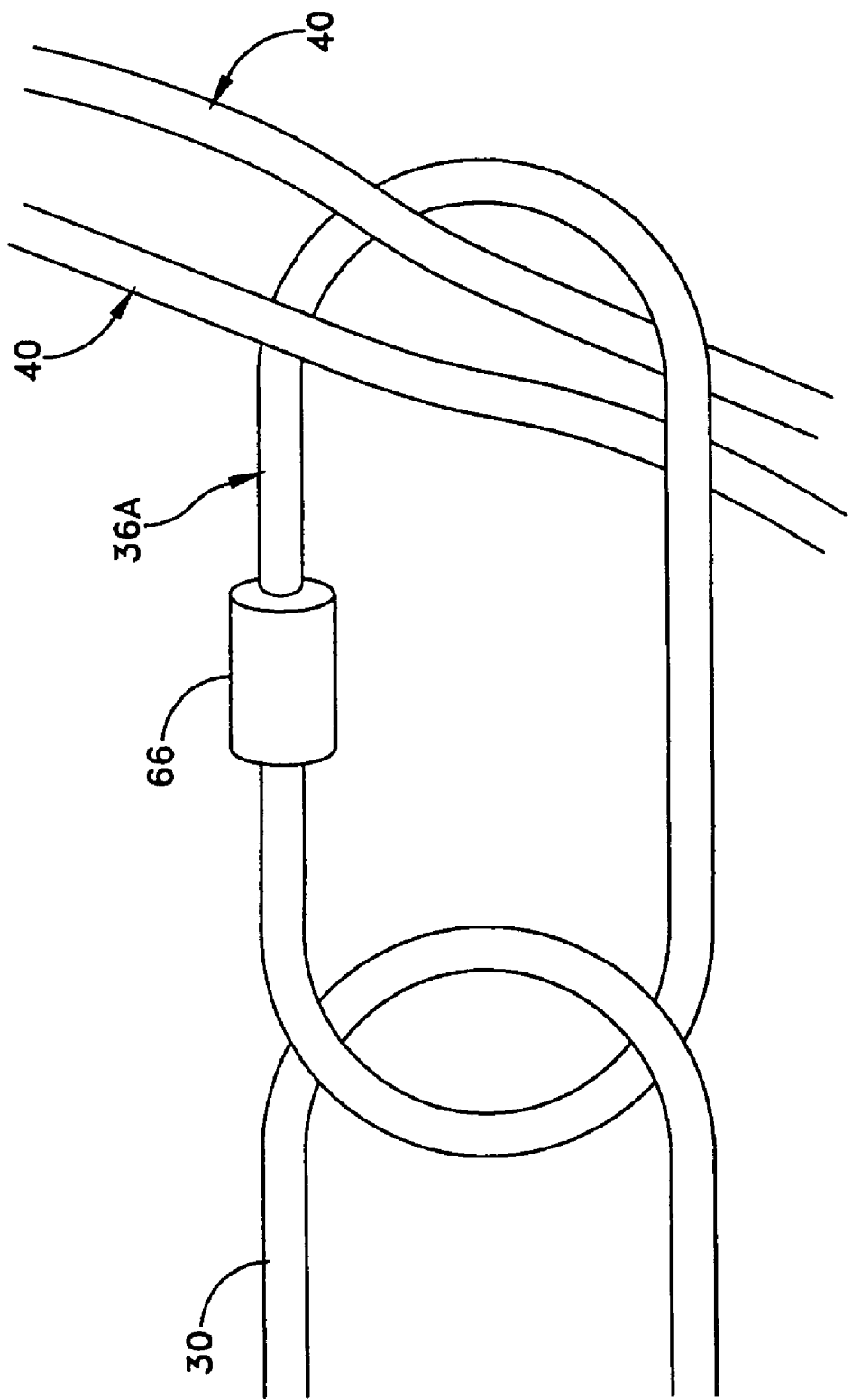
FIG. 2A is similar to FIG. 2, but showing an alternative embodiment.

FIG. 2 illustrates a cord 30, a ring 36 of a ring set 38, and one or more suspension lines 40 slidingly connected to the ring 36 by a loop of material 64. As shown in FIG. 2A, the ring 36 and loop 64 may be replaced by an elongated ring 36A, which may be removable by turning a threaded locking device 66 in known fashion.

In FIG. 1, canopy gore groups 42-45, 47-50, 52-55 and 57-60 are line reefed due to their suspension lines 40 passing through their corresponding ring sets 38. Gores 41, 46, 51, 56 form the initial circumferential skirt opening for inflation of the parachute. This restriction of the gores slows the opening of the parachute.

Figure 3:
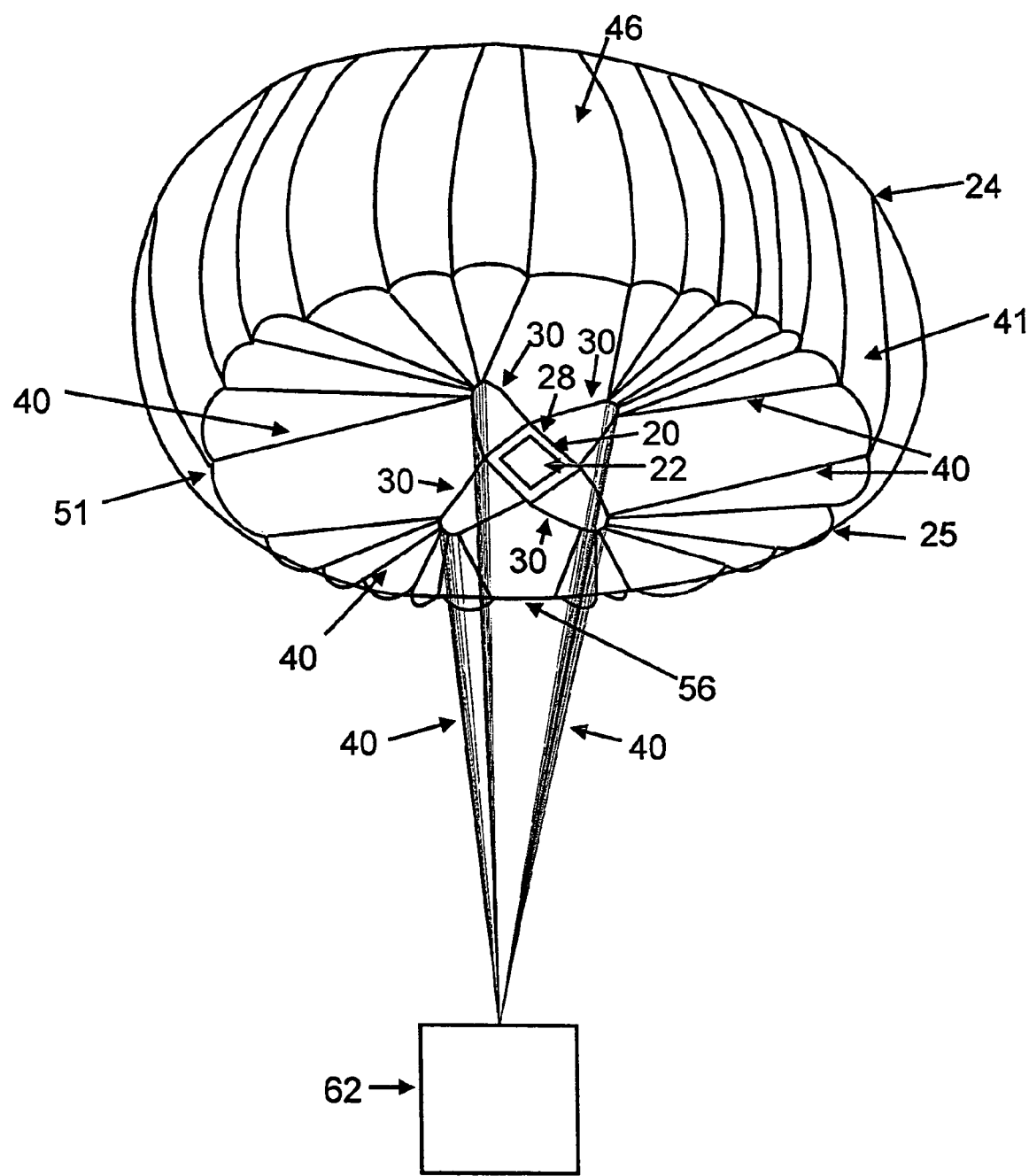
FIG. 3 is a diagrammatic perspective view of a deploying parachute having the reefing assembly of FIGS. 1 and 2.
Figure 4:
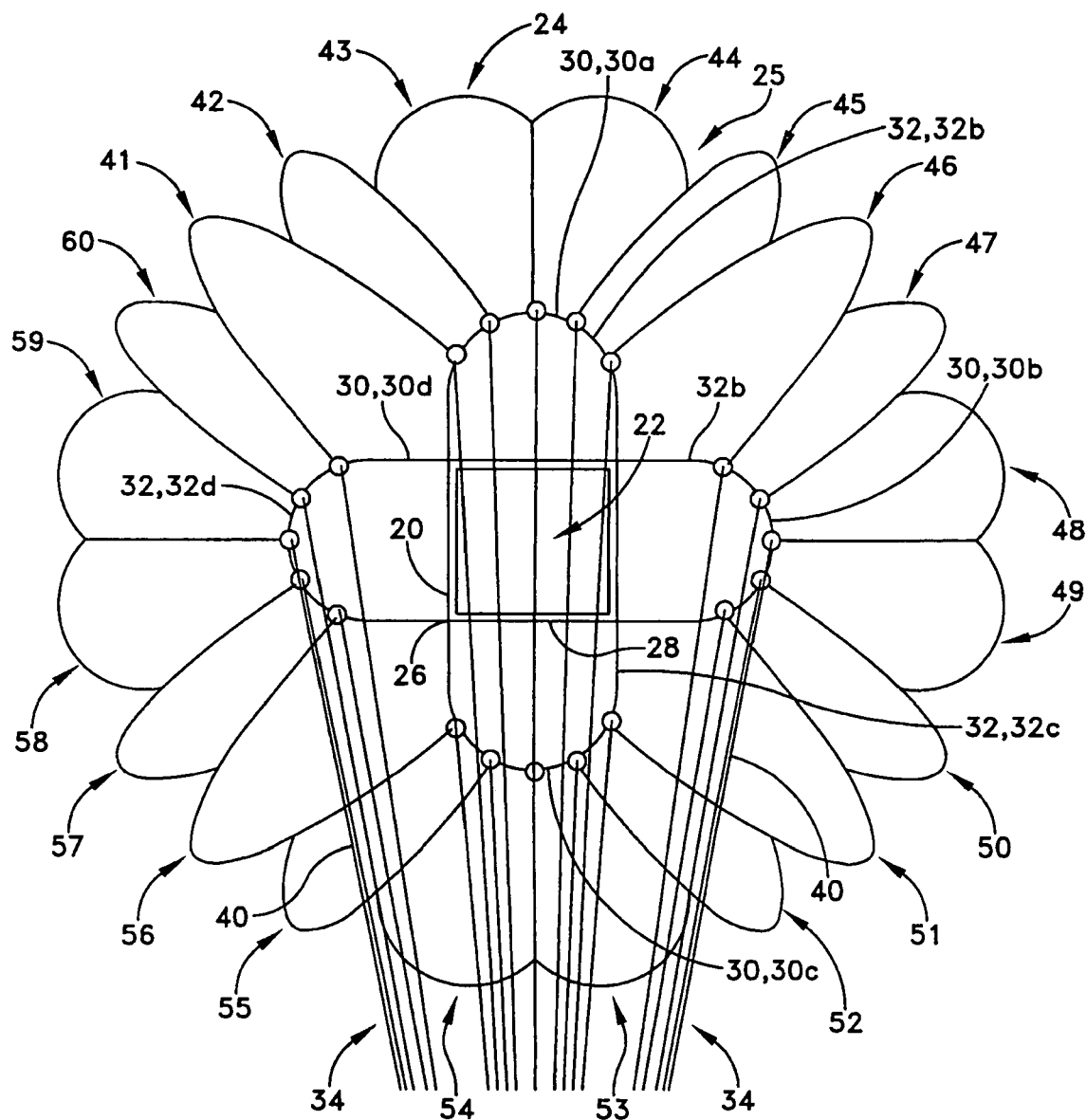
FIG. 4 is an underneath diagrammatic illustration showing the parachute further inflated.

As inflation proceeds (FIG. 3), the reefing assembly made up of tension structure 20, cords 30, and ring sets 38 (FIG. 1), is forced to slide down the parachute suspension lines 40 toward a payload 62 (FIG. 3). Because of the deceleration of the payload 62 by the inflating canopy 24, forces increase in the suspension lines 40 and the canopy gore groups 42-45, 47-50, 52-55, 57-60 (FIGS. 1 and 4) begin to spread circumferentially and radially, at an accelerated rate. To control the accelerated rate of opening and prevent damage to the parachute, the high strength cords 30 continuously change their shape due to the outward radial force produced by the suspension lines 40 as they slide through ring sets 38 (FIG. 1) and rings sets 38 slide along the high strength cords 30, repositioning themselves.

This action reduces a radial distance R1 shown in FIG. 1. The reduction of this radial distance causes the continuous reefing device to produce an inward radial force opposing the forces which are accelerating the opening of the parachute. This process continues during the parachute opening phase, slowing the parachute opening, reducing the opening force on the parachute and payload 62 to a safe and manageable level, until the parachute has completely opened.

Figure 5:
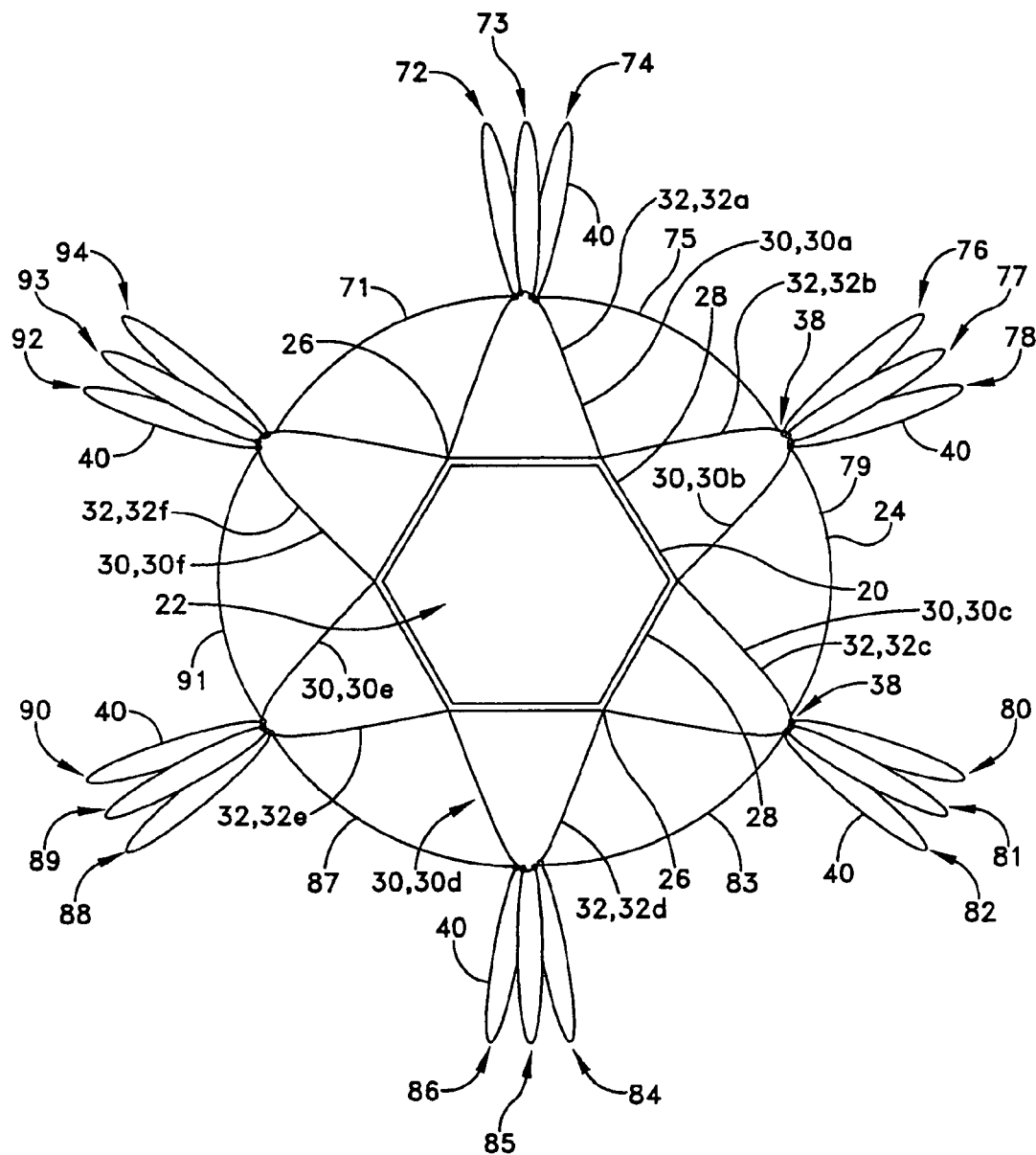
FIG. 5 is similar to FIG. 4, but illustrative of an alternative embodiment of the invention.
Figure 5A:
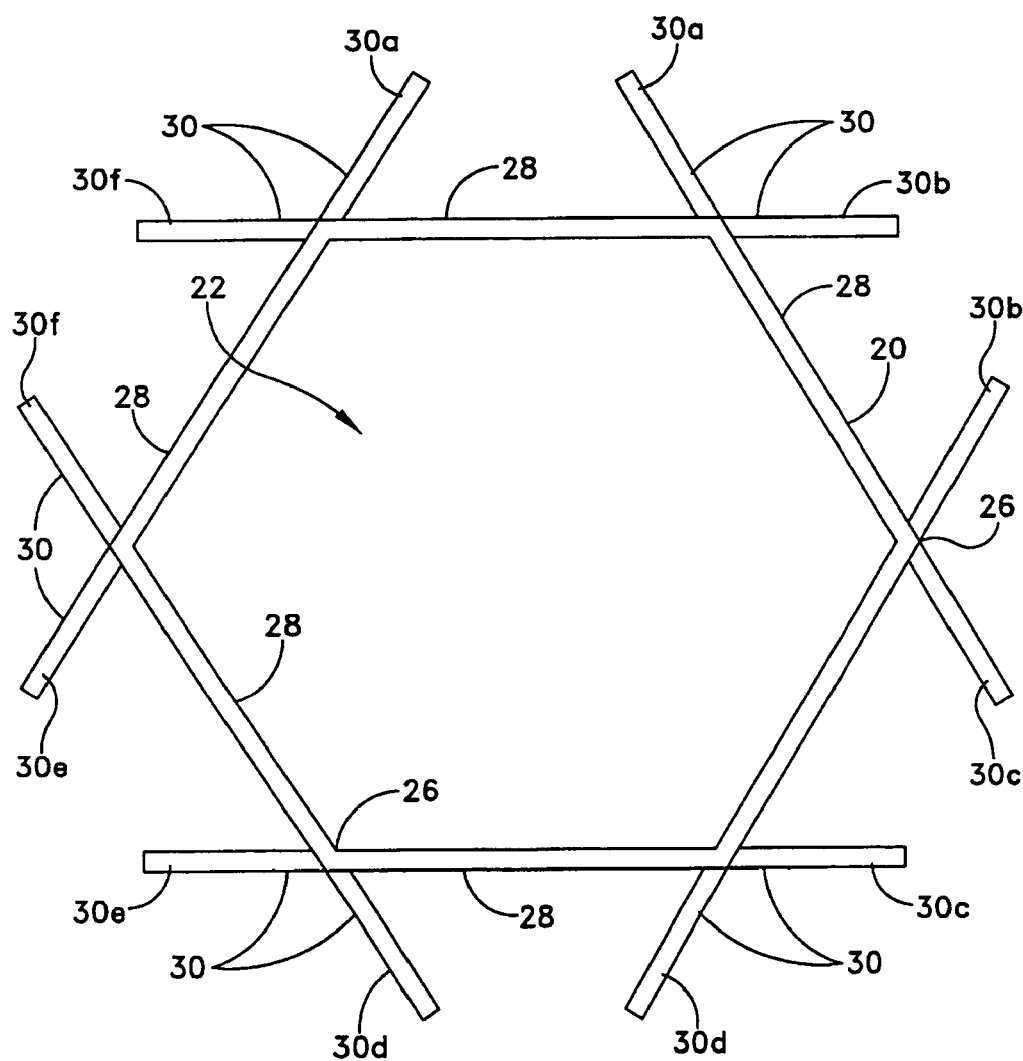
FIG. 5A is a plan view of a central portion of the parachute of FIG. 5.

Referring to FIGS. 5 and 5A, it will be seen that the configuration of a reefing device having six suspension line groups includes the tension structure 20 having six segments 28, six cords 30a, 30b, 30c, 30d, 30e and 30f and a corresponding number of high strength cord loops 32a, 32b, 32c, 32d, 32e and 32f. Gores 71, 75, 79, 83, 87 and 91 make up the parachute skirt initial inflated circumference, while gores 72-74, 76-78, 80-82, 84-86, 88-90 and 92-94 are line reefed by their suspension lines and corresponding ring sets, as configured and shown in FIG. 2.

Larger parachutes with numerically larger numbers of suspension line groups are reefed in similar fashion.

Figure 6:
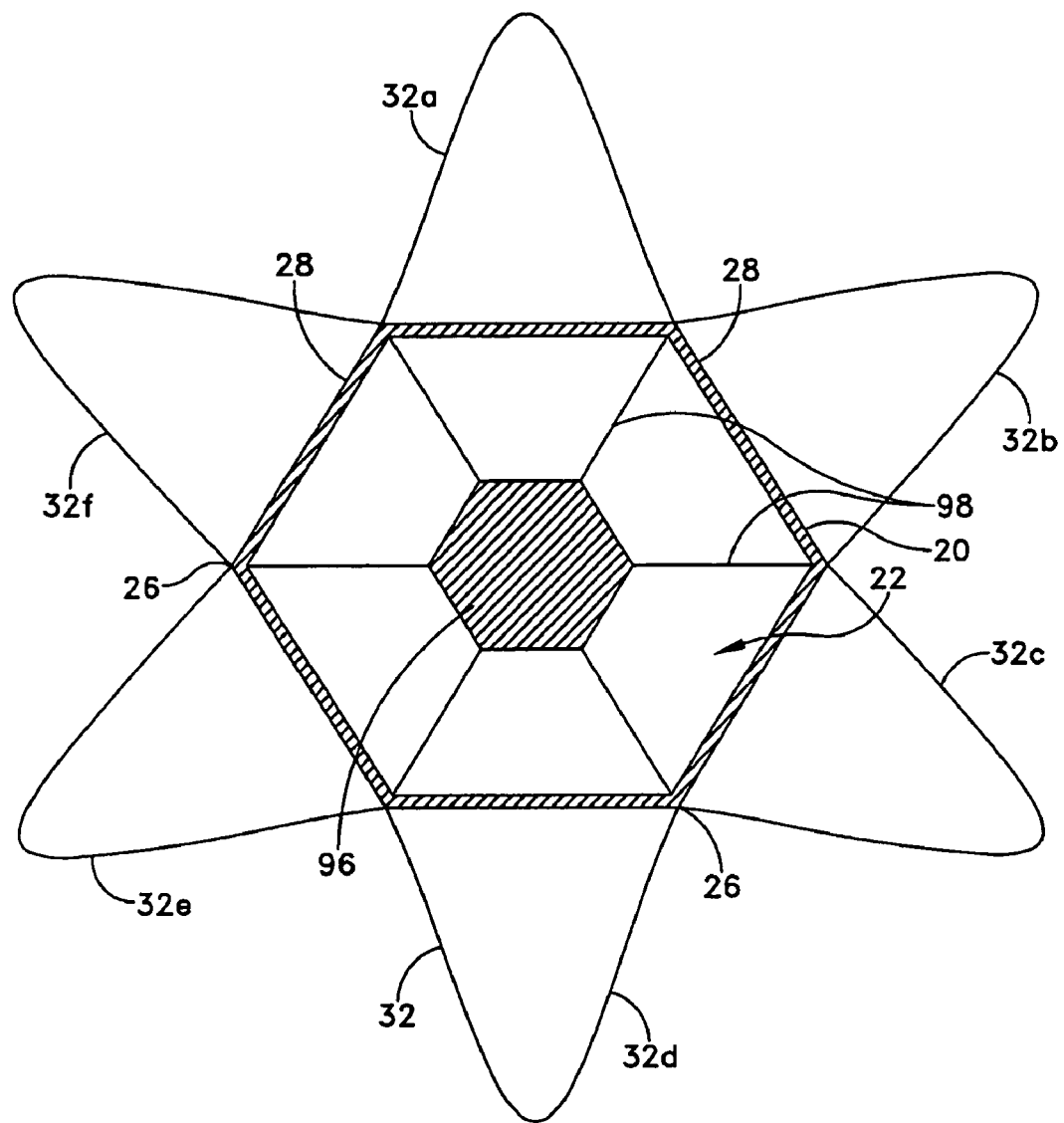
FIG. 6 is similar to FIG. 5 but illustrative of a further alternative embodiment.

When parachute opening times require an increase due to increased payload weight, high deployment velocity, high altitude, or combinations of such conditions, a sail 96 may be added to the reefing assembly, as shown in FIG. 6. Sail 96 increases resistance by increasing aerodynamic drag, thereby slowing the decent of the reefing assembly along the suspension lines 40, through ring sets 38 (FIG. 1), consequently increasing the time required to open the parachute, and reducing the opening force. Sail 96 (FIG. 6) may be fabricated from solid material for high drag, or porous material or netting for lower drag, depending upon requirements. Cords 98 provide a means for attachment of sail 96 to the reefing assembly.

Figure 7:
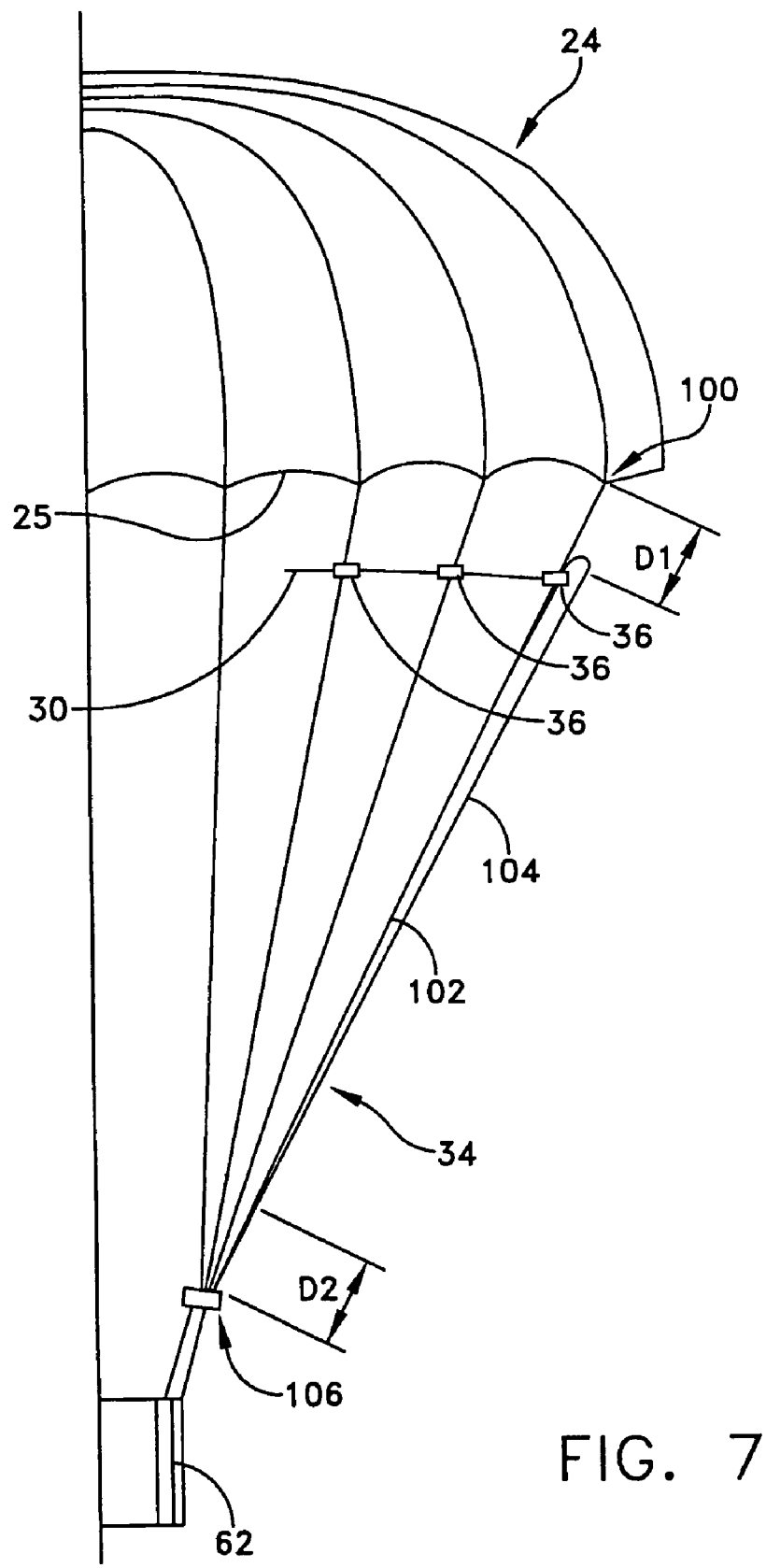
FIG. 7 is a side elevational diagrammatic view of a further alternative embodiment of the invention.
Figure 7A:
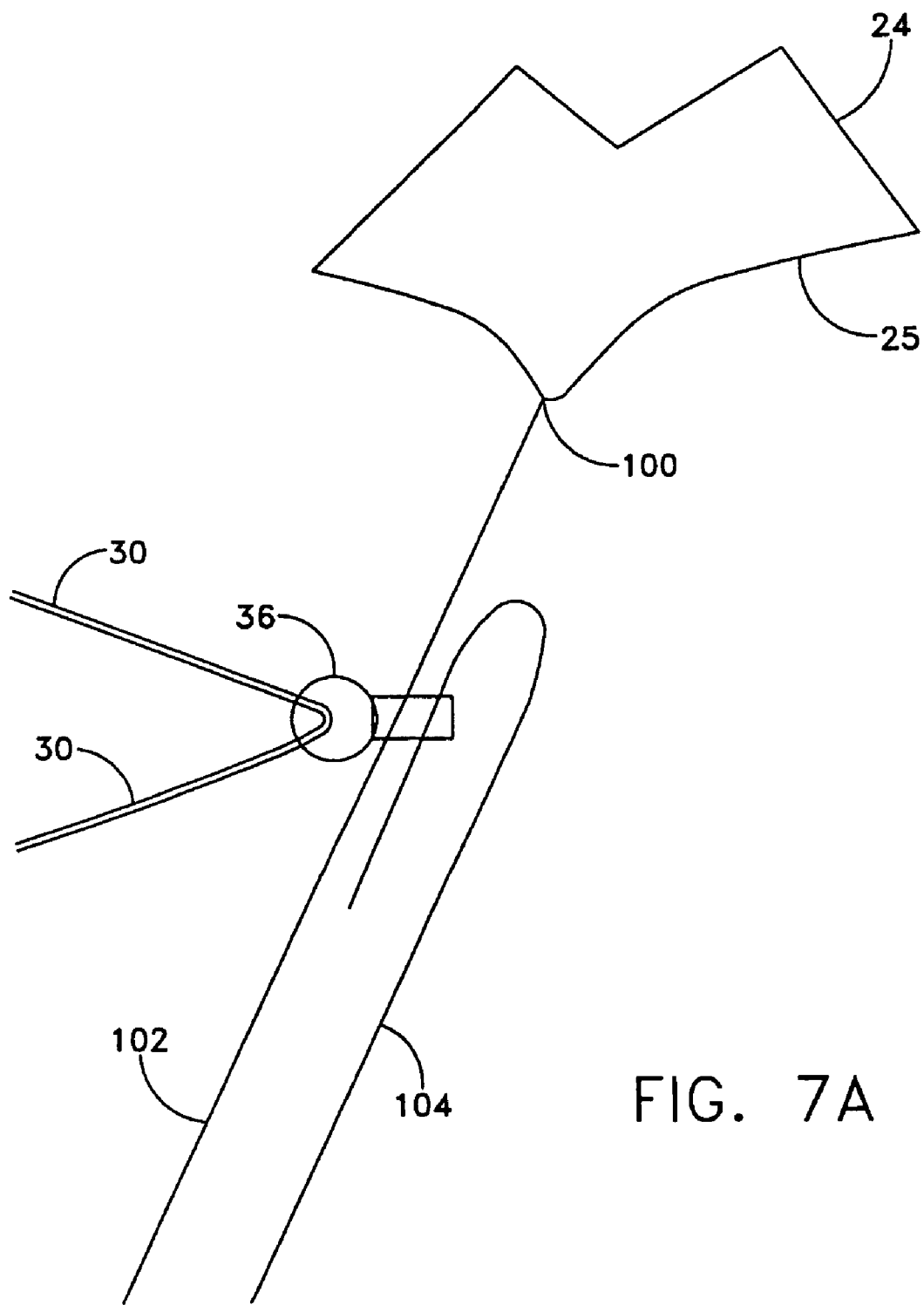
FIG. 7A is an enlarged illustration of a portion of FIG. 7.

Interference between the parachute skirt 25 and rings 36 could cause damage at the suspension line attachment points 100 (FIGS. 7 and 7A). To prevent this, a middle suspension line 102 (FIGS. 1 and 7) of each suspension line group 34 is provided with a guide line 104 (FIG. 7) attached thereto at a selected distance D1 below the parachute skirt 25 in a fashion so as to stop ring set 38 on the middle suspension line 102 from coming into contact with the parachute skirt 25 and suspension line attachment point 100 (FIG. 7).

Guide line 104 runs alongside suspension line 102 and is again attached thereto at some distance D2 above a suspension line group link 106, or is attached directly to the suspension line group link 106. Guide line 104 allows ring 36 on the middle suspension line 102 to travel along line 102 but restrains it and all other ring sets 38 on the cord of that suspension line group from damaging the suspension line attachment points 100 and parachute skirt 25. Each middle suspension line 102 of each suspension line group is provided with a guideline 104 configuration. Guide line 104 attachment point distance D1 can be varied, thereby controlling the initial reefing ratio of the parachute using the reefing assembly described hereinabove.

There is thus provided a reefing assembly which facilitates the restrained opening of a parachute, and thereby reduced opening shock, without the use of a pyrotechnic device and cutter blade subject to pre-set actuation times.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A reefing assembly for a circular parachute comprising a canopy having a skirt portion, and suspension lines attached at first ends thereof to the skirt portion, the assembly comprising:
   a tension structure bounding a central opening and having a plurality of substantially straight segments viewed in plan with the canopy open;
   a plurality of cords, each cord defining a loop having two ends, each end of a loop being fixed to one end of one of the tension structure straight segments;
   a plurality of rings slidably disposed on each of the loops, each of said rings being slidably connected to at least one of the suspension lines;
   wherein said rings are adapted for disposition clustered together at a central portion of their respective loops, and adapted, upon deployment of the canopy, to slide along their respective loops to become substantially equidistantly disposed on their respective loops; and wherein equal numbers of said rings are disposed on each of the loops; and
   wherein the disposition of said rings substantially equidistantly on their respective loops causes substantially equidistant spacing of the suspension lines;
   whereby to facilitate a restrained opening of the canopy and thereby reduce opening shock load.

2. The reefing assembly in accordance with claim 1 wherein said tension structure is substantially rectangularly shaped and is defined by four of the substantially straight segments, and the assembly includes four of said cords.

3. The reefing assembly in accordance with claim 1, and further comprising a sail disposed in the central opening and connected to said tension structure.

4. The reefing assembly in accordance with claim 3 wherein said sail is of a material selected from a group of materials consisting of a solid material, a porous material, and a netting.

5. A reefing assembly for a circular parachute comprising a canopy having a skirt portion, and suspension lines attached at first ends thereof to the skirt portion, the assembly comprising:
   a tension structure bounding a central opening and having a plurality of substantially straight segments viewed in plan with the canopy open;
   a plurality of cords, each cord defining a loop having two ends, each end of a loop being fixed to one end of one of the tension structure straight segments;
   a plurality of rings slidably disposed on each of the loops, each of said rings being slidably connected to at least one of the suspension lines;
   wherein said rings are adapted for disposition clustered together at a central portion of their respective loops, and adapted, upon deployment of the canopy, to slide along their respective loops to become substantially equidistantly disposed on their respective loops; and wherein equal numbers of said rings are disposed on each of the loops; and wherein the disposition of said rings substantially equidistantly on their respective loops causes substantially equidistant spacing of the suspension lines; and
   wherein said tension structure comprises a selected one of tape structure and webbing structure;
   whereby to facilitate a restrained opening of the canopy and thereby reduce opening shock load.

6. A reefing assembly for a circular parachute comprising a canopy having a skirt portion, and suspension lines attached at first ends thereof to the skin portion, the assembly comprising:
   a tension structure bounding a central opening and having a plurality of substantially straight segments viewed in plan with the canopy open;
   a plurality of cords, each cord defining a loop having two ends, each end of a loop being fixed to one end of one of the tension structure straight segments;
   a plurality of rings slidably disposed on each of the loops, each of said rings being slidably connected to at least one of the suspension lines;
   wherein said rings are adapted for disposition clustered together at a central portion of their respective loops, and adapted, upon deployment of the canopy, to slide along their respective loops to become substantially equidistantly disposed on their respective loops; and wherein equal numbers of said rings are disposed on each of the loops; and
   wherein said rings support suspension lines extending from gores of the parachute and each cluster of rings on one of the loops supports a plurality of suspension lines, such that each cluster of rings in the assembly supports a group of suspension lines extending from a group of gores whose deployment depends upon movement of said rings on theft respective loops;
   whereby to facilitate a restrained opening of the canopy and thereby reduce opening shock load.

7. The reefing assembly in accordance with claim 6 wherein any two adjacent ones of the loops support rings which support a further gore extending between the two adjacent loops, the further gore being adapted for immediate opening upon deployment of the parachute.

8. The reefing assembly in accordance with claim 7 wherein said tension structure comprises at least four of said segments.

9. The reefing assembly in accordance with claim 7 wherein said tension structure comprises segments of equal length.

10. The reefing assembly in accordance with claim 6 and further comprising guide lines each fixed at a first end to a suspension line group link and attached at a second end to one of the suspension lines of each group of gores at a selected distance from the canopy skirt to prevent the ring on the one suspension line from contacting the canopy skirt.

11. The reefing assembly in accordance with claim 10 wherein the suspension line in each group of gores to which said guide line is attached is a middle suspension line of the group of gores.

* * * * *